(12) United States Patent
Eoff et al.

(10) Patent No.: US 6,855,201 B2
(45) Date of Patent: Feb. 15, 2005

(54) CEMENTING COMPOSITIONS

(75) Inventors: Larry S. Eoff, Duncan, OK (US); Krista L. Keener, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/714,134

(22) Filed: Nov. 14, 2003

(65) Prior Publication Data

US 2004/0094070 A1 May 20, 2004

Related U.S. Application Data

(62) Division of application No. 10/176,344, filed on Jun. 20, 2002, now Pat. No. 6,715,552.

(51) Int. Cl.$^7$ .............................. C04B 7/00; C04B 24/00
(52) U.S. Cl. ..................... 106/808; 106/724; 106/725; 106/727; 106/728; 106/802; 106/809; 106/810; 106/819; 106/820; 106/823; 523/130; 523/650
(58) Field of Search ................. 106/724, 725, 106/727, 728, 802, 808, 809, 810, 819, 820, 823; 523/130, 650

(56) References Cited

U.S. PATENT DOCUMENTS

| 4,011,909 A | | 3/1977 | Adams et al. ............... 166/293 |
| RE31,190 E | | 3/1983 | Detroit et al. .............. 166/293 |
| 4,471,097 A | * | 9/1984 | Uhl et al. .................... 526/240 |
| 4,515,635 A | | 5/1985 | Rao et al. ...................... 106/90 |
| 4,555,269 A | | 11/1985 | Rao et al. ...................... 106/90 |
| 4,557,763 A | | 12/1985 | George et al. ................ 106/90 |
| 4,640,942 A | | 2/1987 | Brothers ...................... 523/130 |
| 4,674,574 A | | 6/1987 | Savoly et al. ............... 166/293 |
| 4,676,317 A | | 6/1987 | Fry et al. .................... 166/293 |
| 4,687,516 A | | 8/1987 | Burkhalter et al. ........... 106/90 |
| 4,837,271 A | | 6/1989 | Brindopke ............... 525/330.3 |
| 4,938,803 A | | 7/1990 | Huddleston et al. ........ 106/719 |
| 4,941,536 A | | 7/1990 | Brothers et al. ............ 166/293 |
| 4,997,487 A | | 3/1991 | Vinson et al. ............... 106/804 |
| 5,028,271 A | | 7/1991 | Huddleston et al. ........ 106/720 |
| 5,039,433 A | | 8/1991 | Sopko et al. ............. 252/8.551 |
| 5,049,288 A | | 9/1991 | Brothers et al. .......... 252/8.551 |
| 5,076,852 A | | 12/1991 | Bloys et al. ................. 106/725 |
| 5,134,215 A | | 7/1992 | Huddleston et al. ........ 527/400 |
| 5,147,964 A | | 9/1992 | Huddleston et al. ........ 527/400 |
| 5,149,370 A | | 9/1992 | Olaussen et al. ............ 106/737 |
| 5,151,131 A | | 9/1992 | Burkhalter et al. ......... 106/822 |
| 5,184,680 A | | 2/1993 | Totten et al. ................ 166/293 |
| 5,263,542 A | | 11/1993 | Brothers ...................... 166/293 |
| 5,340,397 A | | 8/1994 | Brothers ...................... 106/727 |
| 5,346,550 A | | 9/1994 | Kunzi et al. ................. 106/709 |
| 5,355,955 A | | 10/1994 | Rodrigues et al. .......... 166/293 |
| 5,368,642 A | | 11/1994 | Rodrigues et al. .......... 106/727 |
| 5,389,706 A | | 2/1995 | Heathman et al. ............. 524/5 |
| 5,398,759 A | | 3/1995 | Rodrigues et al. .......... 166/293 |
| 5,421,881 A | | 6/1995 | Rodrigues et al. .......... 106/809 |
| 5,447,198 A | | 9/1995 | Kunzi et al. ................. 166/293 |
| 5,536,311 A | | 7/1996 | Rodrigues ................... 106/724 |
| 5,836,392 A | | 11/1998 | Urlwin-Smith .............. 166/295 |
| 5,866,517 A | | 2/1999 | Carpenter et al. ........... 507/226 |
| 6,136,935 A | | 10/2000 | Udarbe et al. .............. 526/312 |
| 6,187,887 B1 | | 2/2001 | Albrecht et al. ............. 526/264 |
| 6,192,986 B1 | | 2/2001 | Urlwin-Smith .............. 166/195 |
| 6,196,317 B1 | | 3/2001 | Hardy ......................... 166/295 |
| 6,465,587 B1 | | 10/2002 | Bair et al. ................... 526/240 |
| 6,497,283 B1 | | 12/2002 | Eoff et al. ................... 166/293 |
| 6,573,316 B1 | | 6/2003 | Albrecht et al. .............. 524/96 |
| 6,590,050 B1 | | 7/2003 | Bair et al. ................... 526/240 |
| 6,608,159 B2 | | 8/2003 | Fenchl et al. ................ 526/288 |
| 6,739,806 B1 | | 5/2004 | Szymanski et al. ......... 405/267 |
| 6,767,867 B2 | | 7/2004 | Chatterji et al. ............ 507/216 |
| 2003/0008779 A1 | | 1/2003 | Chen et al. ................. 507/200 |

FOREIGN PATENT DOCUMENTS

| GB | 2 210 888 A | 6/1989 | ......... C08F/289/00 |
| WO | WO 99/26991 | 6/1999 | ......... C08F/220/54 |
| WO | WO 03/085013 | 10/2003 | ......... C08F/220/58 |
| WO | WO 03/097721 | 11/2003 | ........... C04B/24/26 |

OTHER PUBLICATIONS

English language translation of WO 03/085013, Spindler, 10–2003.*

* cited by examiner

*Primary Examiner*—Elizabeth D. Wood
(74) *Attorney, Agent, or Firm*—Craig W. Roddy; McAfee & Taft

(57) ABSTRACT

A cement composition is basically comprised of a hydraulic cement, water in an amount sufficient to form a pumpable slurry and a fluid loss control polymer additive comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether.

18 Claims, No Drawings

CEMENTING COMPOSITIONS

This Application is a Divisional of Ser. No. 10/176,344 filed on Jun. 20, 2002 now U.S. Pat. No. 6,715,552.

BACKGROUND OF THE INVENTION

1. Field of the Invention

The present invention relates to well cementing methods and compositions.

2. Description of the Prior Art

Hydraulic cement compositions are commonly utilized in the construction and repair of oil and gas wells. For example, hydraulic cement compositions are used in primary cementing operations whereby strings of pipe such as casing or liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented. Hydraulic cement compositions are also commonly used to plug lost circulation and other undesirable fluid inflow and outflow zones in wells, to plug cracks or holes in pipe strings cemented therein and to accomplish other required remedial well operations.

In order for such well cementing operations to be successful, the cement compositions utilized must include a fluid loss control additive to reduce the loss of fluid, i.e., water, from the cement compositions when they contact permeable subterranean formations or zones. Excessive fluid loss causes a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore.

Heretofore polymers and copolymers have been utilized as fluid loss control additives for well cements. A particularly suitable copolymer which has been utilized as a cement composition fluid loss control additive is a copolymer of 2-acrylamido-2-methyl propane sulfonic acid and N,N-dimethylacrylamide having mole ratios of 2-acrylamido-2-methyl propane sulfonic acid to N,N-dimethylacrylamide of between 1:4 and 4:1 respectively, and having an average molecular weight of between about 75,000 and 3,000,000. While the above described copolymer well cement fluid loss control additive has achieved commercial success, there is a continuing need for improved polymer fluid loss control additives which achieve better fluid loss control in well cement compositions.

SUMMARY OF THE INVENTION

The present invention provides cementing methods and compositions which include improved liquid fluid loss control additives comprised of water soluble polymers which meet the need described above and overcome the deficiencies of the prior art. The water soluble fluid loss control polymer additives which are useful in accordance with this invention are comprised of the following monomers:

a) 5 to 93 weight % of monomers of the formula (Ia) or (Ib) or both:

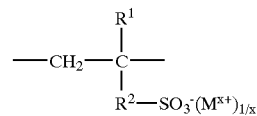
(Ia)

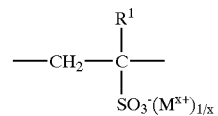
(Ib)

wherein $R^1$ is hydrogen or $C_1$–$C_5$ alkyl, $R^2$ is $C_1$–$C_{20}$ alkylene, carboxy $C_1$–$C_{20}$ alkylene, carboamido $C_1$–$C_{20}$ alkylene or phenylene, M is hydrogen, ammonium or a metal cation in the oxidation state +I, +II or +III and x is 1 to 3;

b) 1 to 50 weight % of monomers of the formula (IIa) or (IIb) or both:

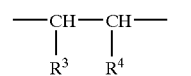
(IIa)

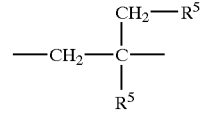
(IIb)

wherein $R^3$ and $R^4$ are —COO$^-$($M^{x+}$)$_{1/x}$ or

$R^5$ is —COO$^-$($M^{x+}$)$_{1/x}$,

M is hydrogen, ammonium or a metal cation in the oxidation state +I, +II or +III and x is 1 to 3;

c) 5 to 93 weight % of a monomer of the formula (III):

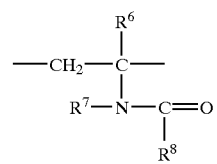
(III)

wherein $R^6$ is hydrogen or $C_1$–$C_5$ alkyl, $R^7$ and $R^8$ are hydrogen, $C_1$–$C_{10}$ alkyl or —(CH$_2$)$_y$— and y is 3 to 7; and d) 1 to 25 weight % of monomers of the formula (IVa) or (IVb) or both:

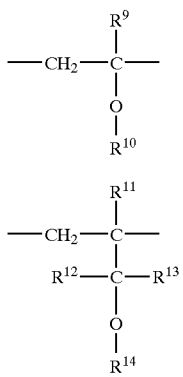

wherein $R^9$ is hydrogen or $C_1$–$C_5$ alkyl, $R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl or $C_6$–$C_{10}$ hydroxyaryl, $R^{11}$, $R^{12}$ and $R^{13}$ are hydrogen or $C_1$–$C_5$ alkyl and $R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl- or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts; and wherein the monomers a) to d) add up to 100 weight %.

The methods of this invention for cementing a subterranean zone penetrated by a well bore are basically comprised of the following steps. A cement composition is provided comprised of a hydraulic cement, sufficient water to form a pumpable slurry and a fluid loss control polymer additive as described above. The composition is placed into the subterranean zone to be cemented and then allowed to set into an impermeable solid mass therein.

The cement compositions of this invention are basically comprised of a hydraulic cement, sufficient water to form a pumpable slurry and a fluid loss control polymer additive as described above.

A preferred fluid loss control polymer additive useful in this invention is a polymer containing the calcium salt of 2-acrylamido-2-methyl propane sulfonic acid in an amount of about 69 weight %, the calcium salt of maleic acid in an amount of about 14 weight %, N-vinyl caprolactam in an amount of about 14 weight % and 4-hydroxybutyl vinyl ether in an amount of about 3 weight %. The polymer additive has a molecular weight of about 250,000.

The objects, features and advantages of the present invention will be readily apparent to those skilled in the art upon a reading of the description of preferred embodiments which follows.

DESCRIPTION OF PREFERRED EMBODIMENTS

The methods of the present invention for cementing a subterranean zone penetrated by a well bore are basically comprised of the following steps. A cement composition is provided comprised of a hydraulic cement, sufficient water to form a pumpable slurry and a fluid loss control polymer additive. The cement composition is placed in the zone to be cemented and thereafter the cement composition is allowed to set into an impermeable solid mass therein. The placement of the cement composition is usually accomplished by pumping the cement composition through the well bore and into the zone to be cemented.

The cement compositions of this invention are basically comprised of hydraulic cement, sufficient water to form a pumpable slurry and a fluid loss control polymer additive.

A variety of hydraulic cements can be utilized in accordance with the present invention including, but not limited to, Portland cements, pozzolana cements, gypsum cements, aluminous cements and silica cements. Portland cements are generally preferred with the types defined and described in *API Specification For Materials And Testing For Well Cements*, API Specification 10, 5th Edition, dated Jul. 1, 1990 of the American Petroleum Institute being particularly suitable. Preferred such API Portland cements include classes A, B, C, G and H with API classes G and H being more preferred.

The water in the cement compositions can be fresh water or salt water. The term "salt water" includes unsaturated salt solutions and saturated salt solutions including brines and seawater. Generally, any water can be utilized so long as it does not adversely affect components of the well cement composition. The water is generally present in a cement composition of this invention in an amount sufficient to form a pumpable slurry, i.e., in an amount in the range of from about 30% to about 120% by weight of cement in the composition. The water is generally present in the cement composition in an amount in the range of from about 35% to about 100% by weight of hydraulic cement therein.

As mentioned above, the polymeric fluid loss control additives useful in accordance with this invention are water soluble polymers containing four different monomers, the principal monomer being an olefinic sulfonic acid.

More specifically, the fluid loss control polymers contain:

a) 5 to 93 weight % of monomers of the formula (Ia) or (Ib) or both:

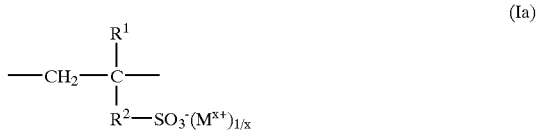

(Ia)

(Ib)

wherein $R^1$ is hydrogen or $C_1$–$C_5$ alkyl, $R^2$ is $C_1$–$C_{20}$ alkylene, carboxy $C_1$–$C_{20}$ alkylene, carboamido $C_1$–$C_{20}$ alkylene or phenylene, M is hydrogen, ammonium or a metal cation in the oxidation state +I, +II or +III and x is 1 to 3;

b) 1 to 50 weight % of monomers of the formula (IIa) or (IIb) or both:

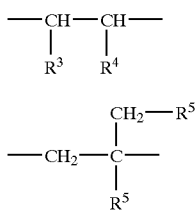

wherein $R^3$ and $R^4$ are $-COO^-(M^{x+})_{1/x}$ or

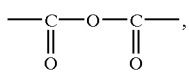

$R^5$ is $-COO^-(M^{x+})_{1/x}$,

M is hydrogen, ammonium or a metal cation in the oxidation state +I, +II or +III and x is 1 to 3;

c) 5 to 93 weight % of a monomer of the formula (III):

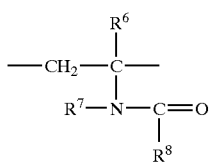

wherein $R^6$ is hydrogen or $C_1$–$C_5$ alkyl, $R^7$ and $R^8$ are hydrogen, $C_1$–$C_{10}$ alkyl or $-(CH_2)_y-$ and y is 3 to 7; and d) 1 to 25 weight % of monomers of the formula (IVa) or (IVb) or both:

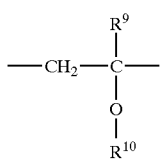

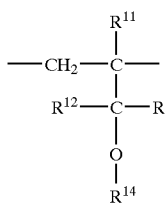

wherein $R^9$ is hydrogen or $C_1$–$C_5$ alkyl, $R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl or $C_6$–$C_{10}$ hydroxyaryl, $R^{11}$, $R^{12}$ and $R^{13}$ are hydrogen or $C_1$–$C_5$ alkyl and $R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl- or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts; and wherein the monomers a) to d) add up to 100 weight %.

$R^1$ and $R^2$ of the monomers of the formulas (Ia) and (Ib) of the fluid loss control polymers of this invention are preferably hydrogen and $-CO-NH-C(CH_3)_2-CH-$, respectively, and M in the monomers of the formulas (Ia), (Ib), (IIa) and (IIb) are preferably metal cations wherein the +I metal cations are alkali metal ions, most preferably sodium or potassium ions, the +II metal cations are alkaline earth metal ions, most preferably calcium or magnesium ions and the +III metal cations are aluminum or iron ions.

In the monomer of the formula (III) y is preferably 3 to 5, and in the monomers of the formulas (IVa) and (IVb) when $R^{10}$ and $R^{14}$ are $C_1$–$C_{20}$ hydroxyalkyl, $C_7$–$C_{20}$ hydroxyalkylaryl or $C_6$–$C_{10}$ hydroxyaryl moieties, the moieties can contain one or more hydroxyl functionalities.

In the monomers of the formulas (IVa) and (IVb), $R^9$ is preferably hydrogen and $R^{10}$ is preferably one of $C_1$–$C_6$ hydroxylalkyl, methyl or hydroxyl terminated mono or poly $C_2$–$C_3$ alkenoxy residue. In the monomer of the formula (IVb), $R^{11}$, $R^{12}$ and $R^{13}$ are preferably hydrogen and $R^{14}$ is preferably 2,3-dihydroxypropyl sulfonic acid, 3-hydroxypropyl sulfonic acid or 2-hydroxypropyl-3-sulfonic acid or the ammonium, alkali metal or alkaline earth metal salts thereof.

The fluid loss control polymers preferably contain 40 to 83 weight % of the monomers of the formulas (Ia), (Ib) or both, 5 to 48 weight % of the monomers of the formulas (IIa), (IIb) or both, 10 to 53 weight % of the monomer of the formula (III) and 1 to 10 weight % of the monomers of the formulas (IVa), (IVb) or both.

The fluid loss control polymers preferably have molecular weights in the range of from 10,000 to 3,000,000 grams per mole, more preferably in the range of from 100,000 to 1,000,000 grams per mole.

A particularly preferred fluid loss control polymer of this invention is comprised of 69 weight % of the calcium salt of 2-acrylamido-2-methyl propane sulfonic acid (I), 14 weight % of the calcium salt of maleic acid (II), 14 weight % of N-vinyl caprolactam (III) and 3 weight % of 4-hydroxybutyl vinyl ether (IV).

The fluid loss control polymer additives of this invention can be prepared using known polymerization techniques.

A fluid loss control polymer additive as described above is included in a cement composition of this invention in an amount in the range of from about 0.1% to about 2% by weight of cement in the composition.

As will be understood by those skilled in the art, a variety of other well cement composition additives known to those skilled in the art can be included in the cement compositions of this invention. Such additives include, but are not limited to, set retarding additives, set accelerating additives, dispersing agents, lightweight additives and the like.

A preferred method of cementing a subterranean zone penetrated by a well bore of this invention is comprised of the steps of: (a) providing a cement composition comprising a hydraulic cement, sufficient water to form a pumpable slurry and a fluid loss control polymer additive comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether; (b) placing the composition in the zone to be cemented; and (c) allowing the cement composition to set into an impermeable solid mass therein.

A more preferred method of cementing a subterranean zone penetrated by a well bore is comprised of the steps of: (a) providing a cement composition comprising Portland cement, sufficient water to form a pumpable slurry and a fluid loss control polymer additive comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether present in the cement composition in an amount in the range of from about 0.1% to about 2% by weight of hydraulic cement therein; (b) placing the composition in the zone to be cemented; and (c) allowing the cement composition to set into an impermeable solid mass therein.

A preferred well cement composition of this invention comprises a hydraulic cement, sufficient water to form a pumpable slurry and a fluid loss control polymer additive comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether.

A more preferred well cement composition comprises Portland cement, sufficient water to form a pumpable slurry and a fluid loss control polymer additive comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether present in the well cement composition in an amount in the range of from about 0.1% to about 2% by weight of cement in the composition.

In order to further illustrate the well cementing methods, compositions and additives of the present invention, the following example is given.

EXAMPLE

A cement composition was prepared containing Portland hydraulic cement, fresh water in an amount of 38% by weight of the cement and a set retarder comprised of a sulfoalkylated lignin. The sulfoalkylated lignin retarder is described in detail in U.S. Pat. No. Re. 31,190 issued to Detroit et al. on Mar. 29, 1983 which is incorporated herein by reference thereto. The cement composition was divided into four test portions. A prior art fluid loss control copolymer additive consisting of a copolymer of N,N-dimethylacrylamide and 2-acrylamido-2-methyl propane sulfonic acid was added to two of the test cement composition portions in amounts of 1% fluid loss control copolymer additive by weight of cement in the composition. The fluid loss control copolymer additive is described in detail in U.S. Pat. No. 4,555,269 issued to Rao et al. on Nov. 26, 1985 which is incorporated herein by reference thereto.

The fluid loss control polymer additive of this invention was added to the remaining two cement composition test portions in 1% by weight of cement amounts. The particular fluid loss control polymer additive of this invention used was comprised of 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether which had a molecular weight of about 250,000. The two cement composition test portions containing the prior art fluid loss control copolymer additives were tested for fluid loss in accordance with the procedure set forth in API Specification 10 mentioned above at temperatures of 100° F.

and 190° F. In a like manner, the test cement composition portions containing the fluid loss control polymer additive of this invention were tested at 100° F. and 190° F. In addition, the portions of the test cement composition were tested for initial viscosity and viscosity after 20 minutes. The results of these tests are given in the Table below.

TABLE

Fluid Loss And Viscosity Tests

| Fluid Loss Control Polymer | Polymer Additive, % by wt. of cement | Set Retarder, % by wt. of cement | Temp., ° F. | Fluid Loss, cc/30 min. | Initial Viscosity, cp | 20 min. Viscosity, cp |
|---|---|---|---|---|---|---|
| A[1] | 1 | 0.2 | 100 | 30 | 25 | 25 |
| A[1] | 1 | 0.2 | 190 | 40 | 15 | 25 |
| B[2] | 1 | 0.2 | 100 | 18 | 21 | 25 |
| B[2] | 1 | 0.2 | 190 | 26 | 18 | 19 |

[1]Polymer A was a prior art copolymer comprised of N,N-dimethylacrylamide and 2-acrylamido-2-methyl propane sulfonic acid.
[2]Polymer B was the fluid loss control polymer additive of this invention.

From the above table, it can be seen that the fluid loss control polymer additive of this invention provides excellent cement composition fluid loss control. Further, the fluid loss control polymer additive of this invention provided better fluid loss control than the prior art fluid loss control copolymer additive.

Thus, the present invention is well adapted to carry out the objects and attain the benefits and advantages mentioned as well as those which are inherent therein. While numerous changes can be made by those skilled in the art, such changes are encompassed within the spirit of this invention as defined by the appended claims.

What is claimed is:

1. A fluid loss control polymer additive comprising 2-acrylamido-2-methyl propane sulfonic acid, maleic acid, N-vinyl caprolactam and 4-hydroxybutyl vinyl ether.

2. A cement composition comprising a hydraulic cement, sufficient water to form a pumpable slurry and a fluid loss control polymer additive that comprises 2-acrylamido-2-methyl propane sulfonic acid, maleic acid, N-vinyl caprolactam and 4-hydroxybutyl vinyl ether.

3. The cement composition of claim 2 wherein the fluid loss control polymer additive is present in the cement composition in an amount in the range of from about 0.1% to about 2% by weight of cement in the composition.

4. The cement composition of claim 2 wherein the water is present in an amount in the range of from about 35% to about 100% by weight of cement of the composition.

5. A fluid loss control polymer additive comprising:
a) 5 to 93 weight % of monomers of the formula (Ia) or (Ib) or both:

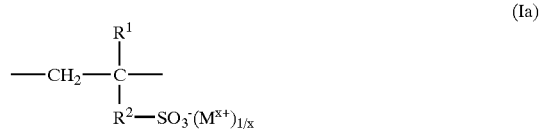

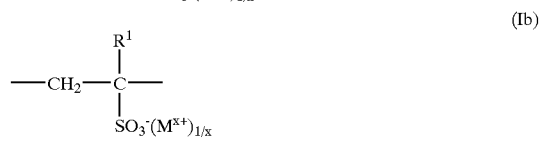

wherein
R$^1$ is hydrogen or C$_1$–C$_5$ alkyl, $R^2$ is $C_1$–$C_{20}$ alkylene, carboxy $C_1$–$C_{20}$ alkylene, carboamido $C_1$–$C_{20}$ alkylene or phenylene, M is hydrogen, ammonium or a metal cation in the oxidation state +I, +II or +III and x is 1 to 3;

b) 1 to 50 weight % of monomers of the formula (IIa) or (IIb) or both:

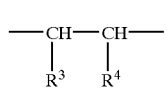
(IIa)

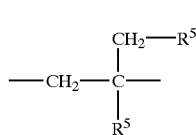
(IIb)

wherein $R^3$ and $R^4$ are —COO$^-$(M$^{x+}$)$_{1/x}$ or

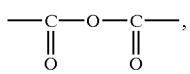

$R^5$ is —COO$^-$(M$^{x+}$)$_{1/x}$,

M is hydrogen, ammonium or a metal cation in the oxidation state +I, +II or +III and x is 1 to 3;

c) 5 to 93 weight % of a monomer of the formula (III):

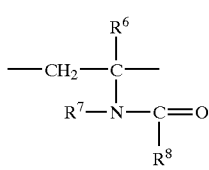
(III)

wherein $R^6$ is hydrogen or $C_1$–$C_5$ alkyl, $R^7$ is hydrogen, $C_1$–$C_{10}$ alkyl or —(CH$_2$)$_y$—, $R^8$ is hydrogen, $C_1$–$C_{10}$ alkyl or —(CH$_2$)$_y$—, and y is 3 to 7; and d) 1 to 25 weight % of monomers of the formula (IVa) or (IVb) or both:

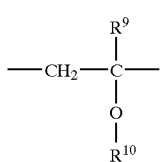
(IVa)

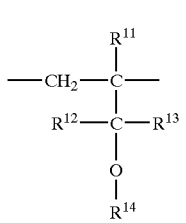
(IVb)

wherein $R^9$ is hydrogen or $C_1$–$C_5$ alkyl, $R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl or $C_6$–$C_{10}$ hydroxyaryl, $R^{11}$ is hydrogen or $C_1$–$C_5$ alkyl, $R^{12}$ is hydrogen or $C_1$–$C_5$ alkyl, $R^{13}$ is hydrogen or $C_1$–$C_5$ alkyl, and $R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl- or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts; and wherein the monomers a) to d) add up to 100 weight %.

6. A cement composition comprising a hydraulic cement, sufficient water to form a pumpable slurry and a fluid loss control polymer additive that comprises:

a) 5 to 93 weight % of monomers of the formula (Ia) or (Ib) or both:

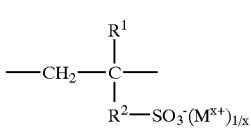
(Ia)

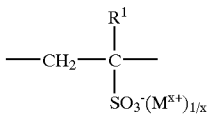
(Ib)

wherein $R^1$ is hydrogen or $C_1$–$C_5$ alkyl, $R^2$ is $C_1$–$C_{20}$ alkylene, carboxy $C_1$–$C_{20}$ alkylene, carboamido $C_1$–$C_{20}$ alkylene or phenylene, M is hydrogen, ammonium or a metal cation in the oxidation state +I, +II or +III and x is 1 to 3;

b) 1 to 50 weight % of monomers of the formula (IIa) or (IIb) or both:

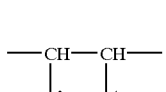
(IIa)

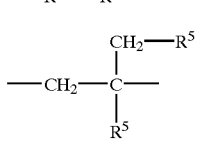
(IIb)

wherein $R^3$ and $R^4$ are —COO$^-$(M$^{x+}$)$_{1/x}$ or

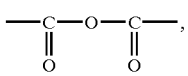

$R^5$ is —COO$^-$(M$^{x+}$)$_{1/x}$,

M is hydrogen, ammonium or a metal cation in the oxidation state +I, +II or +III and x is 1 to 3;

c) 5 to 93 weight % of a monomer of the formula (III):

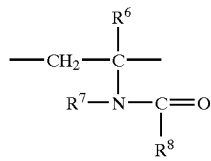
(III)

wherein
$R^6$ is hydrogen or $C_1$–$C_5$ alkyl,
$R^7$ is hydrogen, $C_1$–$C_{10}$ alkyl or —$(CH_2)_y$—,
$R^8$ is hydrogen, $C_1$–$C_{10}$ alkyl or —$(CH_2)_y$—, and
y is 3 to 7; and d) 1 to 25 weight % of monomers of the formula (IVa) or (IVb) or both:

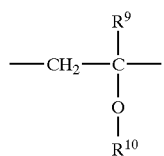
(IVa)

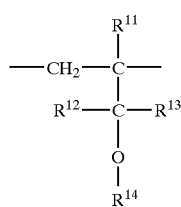
(IVb)

wherein
$R^9$ is hydrogen or $C_1$–$C_5$ alkyl,
$R^{10}$ is $C_1$–$C_{10}$ alkyl, $C_1$–$C_{10}$ aminoalkyl, $C_1$–$C_{20}$ hydroxyalkyl, $C_1$–$C_4$ alkyl or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl or $C_6$–$C_{10}$ hydroxyaryl,
$R^{11}$ is hydrogen or $C_1$–$C_5$ alkyl,
$R^{12}$ is hydrogen or $C_1$–$C_5$ alkyl,
$R^{13}$ is hydrogen or $C_1$–$C_5$ alkyl, and
$R^{14}$ is hydrogen, $C_1$–$C_{20}$ alkyl, $C_1$–$C_{10}$ aminoalkyl, $C_1$–$C_{20}$ hydroxyalkyl, $C_1$–$C_4$ alkyl- or hydroxyl terminated mono- or poly-$C_2$–$C_3$ alkylenoxy (with 1 to 400 alkylenoxy units), $C_7$–$C_{20}$ alkylaryl, $C_7$–$C_{20}$ hydroxyalkylaryl, $C_6$–$C_{10}$ aryl, $C_6$–$C_{10}$ hydroxyaryl or with hydroxyl substituted $C_1$–$C_{20}$ alkylensulfonic acids and their ammonium, alkali metal or alkaline earth metal salts; and wherein the monomers a) to d) add up to 100 weight %.

7. The cement composition of claim 6 wherein the fluid loss control polymer additive is present in the cement composition in an amount in the range of from about 0.1% to about 2% by weight of cement in the composition.

8. The cement composition of claim 6 wherein the hydraulic cement is selected from the group consisting of Portland cements, pozzolana cements, gypsum cements, aluminous cements and silica cements.

9. The cement composition of claim 6 wherein the hydraulic cement is Portland cement.

10. The cement composition of claim 6 wherein the water is selected from the group consisting of fresh water and salt water.

11. The cement composition of claim 6 wherein the water is present in an amount in the range of from about 35% to about 100% by weight of cement of the composition.

12. A fluid loss control polymer additive comprising 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether.

13. A cement composition comprising a hydraulic cement, sufficient water to form a pumpable slurry and a fluid loss control polymer additive that comprises 69 weight % of the calcium salt of 2-acrylamido-2-methyl propane sulfonic acid, 14 weight % of the calcium salt of maleic acid, 14 weight % of N-vinyl caprolactam and 3 weight % of 4-hydroxybutyl vinyl ether.

14. The cement composition of claim 13 wherein the fluid loss control polymer additive is present in the cement composition in an amount in the range of from about 0.1% to about 2% by weight of cement in the composition.

15. The cement composition of claim 13 wherein the hydraulic cement is selected from the group consisting of Portland cements, pozzolana cements, gypsum cements, aluminous cements and silica cements.

16. The cement composition of claim 13 wherein the hydraulic cement is Portland cement.

17. The cement composition of claim 13 wherein the water is selected from the group consisting of fresh water and salt water.

18. The cement composition of claim 13 wherein the water is present in an amount in the range of from about 35% to about 100% by weight of cement of the composition.

* * * * *